United States Patent [19]

Mattes et al.

[11] Patent Number: 6,100,797
[45] Date of Patent: Aug. 8, 2000

[54] SYSTEM FOR PRODUCING A RELEASE SIGNAL FOR A VEHICLE SAFETY DEVICE

[75] Inventors: Bernhard Mattes, Sachsenheim; Volker Breunig, Heilbronn-Neckargartach; Michael Henne, Zaberfeld; Lothar Groesch, Stuttgart, all of Germany

[73] Assignee: Robert Bosch GmbH, Stuttgart, Germany

[21] Appl. No.: 09/297,846

[22] PCT Filed: Sep. 15, 1998

[86] PCT No.: PCT/DE98/02725

§ 371 Date: May 6, 1999

§ 102(e) Date: May 6, 1999

[87] PCT Pub. No.: WO99/17963

PCT Pub. Date: Apr. 15, 1999

[30] Foreign Application Priority Data

Oct. 6, 1997 [DE] Germany .................. 197 44 085

[51] Int. Cl.⁷ ..................................... B60Q 1/00
[52] U.S. Cl. ................ 340/437; 340/438; 340/440
[58] Field of Search .......................... 340/436, 437, 340/438, 440

[56] References Cited

U.S. PATENT DOCUMENTS 5,756,948  5/1998  Husby et al. .................. 200/61.53

*Primary Examiner*—Edward Lefkowitz
*Attorney, Agent, or Firm*—Michael J. Striker

[57] ABSTRACT

To assure that the safety device is triggered at the right time in the event of a lateral collision of the vehicle with a curb, a first comparing device (1) compares a rotation rate ($\omega x$) measured relative to the longitudinal axis of the vehicle, or a variable derived from this rotation rate, with a rotation rate threshold value. A second comparing device (2) compares an acceleration (ay), measured in the direction of the transverse axis of the vehicle, with a lateral acceleration threshold value. If both threshold comparing device (1, 2) simultaneously signal that their threshold values are being exceeded, a trigger signal (as1) for the safety device is output.

3 Claims, 1 Drawing Sheet

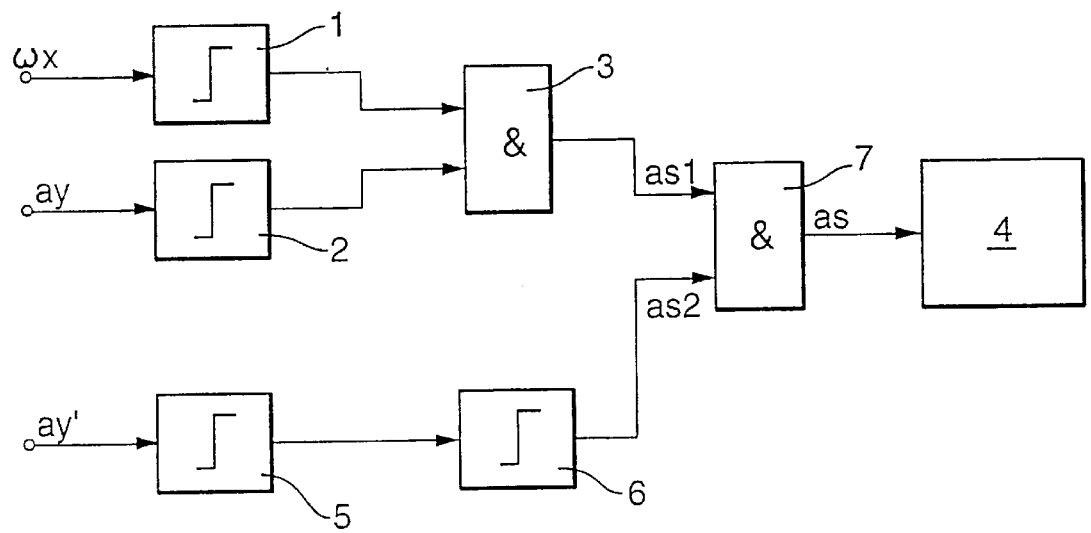

SYSTEM FOR PRODUCING A RELEASE SIGNAL FOR A VEHICLE SAFETY DEVICE

BACKGROUND OF THE INVENTION

The present invention relates to an arrangement for generating a trigger signal for a safety device in a vehicle in a lateral collision with a low obstacle, such as a curb. In a lateral collision of a vehicle with a curb or similar low obstacle, the occupants of a vehicle are subjected to a very high lateral acceleration, so even before the vehicle starts to tip or roll over, there is a risk of injury to the occupants.

SUMMARY OF THE INVENTION

It is therefore the object of the invention to provide an arrangement of the type defined at the outset that is triggered early in a lateral collision of the vehicle with a low obstacle, even before the vehicle begins to roll over.

According to the invention a first comparing means compares a rotation rate, or a variable derived from it, with a rotation rate threshold value. A second comparing means compares an acceleration measured in the direction of the transverse axis of the vehicle with a lateral acceleration threshold value. Whenever both comparing means simultaneously signal that their threshold values have been exceeded, switch means output a trigger signal for the safety device. By a suitable selection of the threshold values, this arrangement brings about a very early triggering of the safety device whenever the vehicle laterally collides with a low obstacle.

Triggering the safety device by mistake can be largely precluded with the characteristics of a preferred embodiment, by providing that in a further parallel signal branch, a third comparing means compares an acceleration measured in the direction of the transverse axis of the vehicle with another lateral acceleration threshold value, this acceleration being measured by an acceleration sensor which is designed to sense lower accelerations than an acceleration sensor for sensing the acceleration supplied to the second comparing means. A fourth comparing means detects the length of time during which the threshold value of the third comparing means is exceeded and outputs a trigger signal for the safety device if this length of time exceeds a predetermined time threshold. The outputs of the two signal branches are applied to a logical linkage circuit, which switches a trigger signal through to the safety device only whenever both signal branches furnish a trigger signal simultaneously.

BRIEF DESCRIPTION OF THE DRAWINGS

The invention will be described in further detail below in terms of an exemplary embodiment shown in the drawing.

The sole FIGURE of the drawing is a block circuit diagram of a circuit that generates a trigger signal for a safety device if the vehicle laterally collides with a low obstacle.

DESCRIPTION OF THE PREFERRED EMBODIMENTS

This circuit has two signal branches. Two comparing means 1 and 2 are located in the first signal branch. The comparing means 1 compares the rotation rate ($\omega x$), measured by a rotation rate sensor about the longitudinal axis x of the vehicle, or a variable (such as an angle) derived from it, with an empirically ascertained threshold value. The second comparing means compares an acceleration ay, measured in the direction of the transverse axis y of the vehicle by an acceleration sensor, with an empirically ascertained threshold value. Each of the two comparing means 1, 2 outputs an output signal to an AND gate 3 if the threshold specified for it has been exceeded. If the predetermined threshold for the rotation rate $\omega x$ and for the acceleration ay has been exceeded in both the threshold comparing means 1 and 2 at the same time, then the AND gate 3, at its output, outputs a trigger signal as1 of the safety device 4.

To prevent malfunctions in the sensors or circuit elements in the first signal branch from causing the safety device to be triggered by mistake, a second, parallel signal branch is provided, which has a third and a fourth threshold comparing means 5, 6. The third threshold comparing means 5 compares an acceleration ay' measured in the direction of the transverse axis y of the vehicle with a predetermined, empirically ascertained threshold value. This acceleration ay' is measured by an acceleration sensor which is designed to sense lower accelerations (up to 3 g) than an acceleration sensor for sensing the acceleration (greater than 10 g) that is supplied to the second threshold value decider 2 in the first signal branch.

If the measured acceleration ay' in the third comparing means 5 exceeds the predetermined threshold, then the following fourth comparing means 6 detects the length of time during which the threshold of the third comparing means 5 is exceeded by the measured acceleration ay'. The fourth comparing means 6 outputs a trigger signal as2 for the safety device 4 whenever this length of time exceeds a predetermined time threshold.

The output signal as1 of the AND gate 3 of the first signal branch and the output signal as2 of the second signal branch are delivered to a further AND gate 7. This AND gate 7 switches a trigger signal as through to the safety device 4 only whenever both signal branches furnish a trigger signal as1, as2 simultaneously.

If the wheels of a vehicle laterally collide with a curb, then relatively high lateral accelerations occur, which rapidly cause the occupants to shift sideways. Because the primary triggering criterion—an acceleration ay in the direction of the transverse axis y—is moreover linked with the rotation rate $\omega x$, it is possible to ascertain with great certainty whether the vehicle is threatening to roll over. In such a case, the safety device must already be tripped by the time the vehicle has reached a rotational angle of 10°. In vehicle rotations that can be ascribed to other factors than a lateral collision with a low obstacle (curb), a safety device must not be allowed to be triggered until far beyond such a slight rotational angle as 10°. It is thus appropriate to provide a sensor system, as described above, that is intended to detect solely a lateral collision with a low obstacle. In the choice of thresholds for $\omega x$, ay and ay', the lateral motion of the occupants should be taken into account. The safety device must be triggered early enough that belt tightening, for instance, will still have some effect; that is, the occupant cannot be allowed to have slipped out of the belt by then. In general, the occupant must not have been allowed to shift too far to the side by then.

What is claimed is:

1. A device for generating a trigger signal for activating a safety device in a vehicle when there is a lateral collision between the vehicle and a low obstacle, said device comprising a first comparing means (1) for comparing a rate ($\omega x$) of rotation about a longitudinal axis (x) of the vehicle with a rotation rate threshold;

a second comparing means (2) for comparing a lateral acceleration (ay) measured in a direction (y) transverse to said longitudinal axis of the vehicle with a lateral acceleration threshold; and triggering means (3) for generating the trigger signal for activating the safety device when said rate of rotation exceeds said rotation rate threshold and said lateral acceleration exceeds said lateral acceleration threshold as determined by said first and second comparing means.

2. A device for generating a trigger signal for activating a safety device in a vehicle when there is a lateral collision between the vehicle and a low obstacle, said device comprising a first comparing means (1) for comparing a rate ($\omega x$) of rotation about a longitudinal axis (x) of the vehicle with a rotation rate threshold;

a second comparing means (2) for comparing a lateral acceleration (ay) measured in a direction (y) transverse to said longitudinal axis of the vehicle with a lateral acceleration threshold;

a third comparing means (5) for comparing another lateral acceleration (ay') in said direction (y) transverse to said longitudinal axis of the vehicle with another lateral acceleration threshold different from said lateral acceleration threshold;

a fourth comparing means (6) for comparing a time interval during which said another lateral acceleration (ay') exceeds said another lateral acceleration threshold according to said third comparing means with a predetermined time interval threshold; and triggering means (3,7) for generating the trigger signal for activating the safety device when said rate of rotation exceeds said rotation rate threshold, said lateral acceleration (ay) exceeds said lateral acceleration threshold as determined by said first and second comparing means, and said another lateral acceleration (ay') exceeds said another lateral acceleration threshold for said predetermined time interval as determined by said third and fourth comparing means;

wherein said second comparing means (2) includes an acceleration sensor and said third comparing means (5) includes another acceleration sensor for acceleration values smaller than those measured by said acceleration sensor of said second comparing means.

3. The device as defined in claim 2, wherein said triggering means (3,7) includes an AND gate (3) for generating a first output signal (as1) if said rate of rotation exceeds said rotation rate threshold and said lateral acceleration (ay) exceeds said lateral acceleration threshold as determined by said first and second comparing means and logical linkage circuit (7) for combining said first output signal (as1) with a second output signal (as2) from said fourth comparing means to obtain the trigger signal when said another lateral acceleration (ay') exceeds said another lateral acceleration threshold for said predetermined time interval as determined by said third and fourth comparing means.

* * * * *